(12) United States Patent
Hoffman

(10) Patent No.: US 11,472,083 B2
(45) Date of Patent: Oct. 18, 2022

(54) INJECTION MOLD MASTER UNIT DIE BACK PLATE COOLING WITH METAL BACKFILLED PLASTIC MOLD

(71) Applicant: Honda Motor Co., Ltd., Tokyo (JP)

(72) Inventor: Benjamin Adam Hoffman, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 16/984,316

(22) Filed: Aug. 4, 2020

(65) Prior Publication Data
US 2021/0086422 A1 Mar. 25, 2021

Related U.S. Application Data

(60) Provisional application No. 62/905,823, filed on Sep. 25, 2019.

(51) Int. Cl.
*B29C 45/73* (2006.01)
*B29C 33/38* (2006.01)
(Continued)

(52) U.S. Cl.
CPC .......... *B29C 45/7331* (2013.01); *B29C 33/38* (2013.01); *B29C 33/42* (2013.01);
(Continued)

(58) Field of Classification Search
CPC .............. B29C 2033/422; B29C 33/38; B29C 33/3828; B29C 33/40; B29C 33/42; B29C 45/2673; B29C 45/7312; B29C 45/7331
See application file for complete search history.

(56) References Cited

U.S. PATENT DOCUMENTS 3,356,128 A 12/1967 Ahrens
5,032,076 A 7/1991 Jackson, Jr.
(Continued)

FOREIGN PATENT DOCUMENTS

CN 1923493 3/2007
CN 104723525 6/2015
(Continued)

OTHER PUBLICATIONS

CN104723525A—Machine Translation (Year: 2015).*
(Continued)

*Primary Examiner* — Yunju Kim
(74) *Attorney, Agent, or Firm* — Rankin, Hill & Clark LLP

(57) ABSTRACT

A reusable mold for injection molding and molding method includes a reusable mold member, a mold cavity defined in the mold member, and at least one heat sink recess defined in the mold member for accommodating a heat sink material. The mold member is mounted on a liquid cooled mold platen. Heat is rapidly removed from the mold cavity when the mold member is used to injection mold a molded part through the heat sink material and through an interface between the heat sink material and the liquid-cooled mold platen. The reusable mold injection molds a molded part and rapidly removes heat from the mold cavity via the heat sink material accommodated in the at least one heat sink recess and through the liquid-cooled platen.

9 Claims, 10 Drawing Sheets

(51) Int. Cl.
  *B29C 33/42*   (2006.01)
  *B29C 45/26*   (2006.01)
  *B33Y 80/00*   (2015.01)
(52) U.S. Cl.
  CPC .... *B29C 45/2673* (2013.01); *B29C 2033/422* (2013.01); *B33Y 80/00* (2014.12)

(56) References Cited

U.S. PATENT DOCUMENTS

| | | | |
|---|---|---|---|
| 5,094,607 | A | 3/1992 | Masters |
| 5,555,184 | A | 9/1996 | Jaskowiak et al. |
| 5,930,117 | A | 7/1999 | Gengel |
| 6,614,123 | B2 | 9/2003 | Lee et al. |
| 6,724,071 | B2 | 4/2004 | Combs |
| 8,030,756 | B2 | 10/2011 | Lee et al. |
| 2007/0187839 | A1* | 8/2007 | Shim ............... H01L 23/49568 257/784 |
| 2010/0252963 | A1 | 10/2010 | Scharf et al. |
| 2011/0182309 | A1* | 7/2011 | Deri ................. H01S 5/02469 372/36 |
| 2013/0224327 | A1 | 8/2013 | Altonen et al. |
| 2016/0003912 | A1 | 1/2016 | Iwane et al. |
| 2016/0059461 | A1 | 3/2016 | Altonen et al. |
| 2019/0202148 | A1 | 7/2019 | Feigenblum |

FOREIGN PATENT DOCUMENTS

| | | |
|---|---|---|
| CN | 205255410 | 5/2016 |
| JP | S6146366 | 3/1986 |
| JP | 2006130539 | 5/2006 |
| JP | 4405931 B2 | 1/2010 |
| JP | 2018118458 | 8/2018 |
| WO | WO2017037713 | 3/2017 |
| WO | WO-2018222475 A1 * | 12/2018 ......... B29C 33/3842 |

OTHER PUBLICATIONS

Office Action of U.S. Appl. No. 15/928,209 dated Sep. 15, 2020, 16 pages.
Mark Bashor; 3D Printed Injection Molds; http://www.moldmakingtechnology.com/cdn/cms/1%20stratasys.pdf; pp. 1-43.
Lou Young; Reshaping Moldmaking; http://www.moldmakingtechnology.com/articles/reshaping-moldmaking-; Jun. 1, 2016; pp. 1-3.
Why 3D Printing is the answer for short-series production; https://medium.com/extreme-engineering/why-3d-printing-is-the-answer-for-short-series-production-9f7ffe99e4e; Apr. 27, 2017; pp. 1-12.
Tooling: 3D Printed Mold Inserts With Conformal Cooling; http://www.ptonline.com/products/tooling-3d-printed-mold-inserts-with-conformal-cooling; Apr. 18, 2017; pp. 1-3.
Advisory Action of U.S. Appl. No. 15/928,209 dated Jul. 2, 2021, 7 pages.
Office Action of U.S. Appl. No. 15/928,209 dated Nov. 18, 2021, 13 pages.
Office Action of U.S. Appl. No. 15/928,209 dated Apr. 21, 2021, 9 pages.
Notice of Allowance of U.S. Appl. No. 15/928,209 dated Apr. 14, 2022, 12 pages.

* cited by examiner

INJECTION MOLD MASTER UNIT DIE BACK PLATE COOLING WITH METAL BACKFILLED PLASTIC MOLD

BACKGROUND

Mold tooling for injection molding is conventionally machined from a bulk metallic material, such as via CNC machining. In recent years, utilization of additive manufactured plastic mold tooling has become a potential replacement for conventional machined metal mold tooling, particularly for low volume molded parts and prototypes. Additive manufacturing, for example 3D printing, builds net shape or near net shape parts (e.g., mold tooling) by depositing material in a layer by layer process directly from a 3D model. Utilizing the additive manufactured process can substantially reduce the time and expense associated with machining conventional metal mold members, and can reduce the amount of material waste, such as would typically be generated during CNC machining of mold tooling.

Conventionally, plastic additive manufactured tooling is generally used for early development concepts where the mechanical properties of the injection molded part are not critical. Relatedly, recent research has shown that utilizing plastic additive manufactured tooling can cause a significant change in some mechanical properties of the final molded part as compared to molded parts injection molded via conventional metal mold tooling. Heretofore, this has prevented or reduced the likelihood of plastic additive manufactured tools from being used for functional development parts, bridge tooling, low volume production tools, etc.

BRIEF DESCRIPTION

According to one aspect, a reusable mold for injection molding includes a reusable mold member, a mold cavity defined in the mold member, at least one heat sink recess defined in the mold member for accommodating a heat sink material therein for rapidly removing heat from the mold cavity when the mold member is used to injection mold a molded part, and a mold platen on which the mold member is arranged, and including cooling lines through which a cooling fluid travels.

According to another aspect, a molding method for injection molding with a reusable mold includes providing a reusable mold member having a mold cavity defined therein and at least one heat sink recess defined therein accommodating a heat sink material for rapidly removing heat from the mold cavity. A mold member is arranged in a mold platen including internal cooling lines. The method further includes injection molding a molded part with the reusable mold member while a cooling fluid is moving through the cooling lines. Heat is rapidly removed from the mold cavity of the mold member via the heat sink material accommodated in the at least one heat sink recess and through an interface between the heat sink material and the mold platen.

According to a further aspect, a molding method for injection molding includes adding a fusible metal alloy to a reusable mold member, injection molding a molded part with the reusable mold member, and rapidly cooling the molded part in the reusable mold member by transferring heat from the molded part to the fusible metal alloy sufficient to phase change the fusible metal alloy from a solid state to a liquid state and by liquid cooling a mold platen that is in direct contact with the fusible metal alloy.

DETAILED DESCRIPTION

Figure 1:
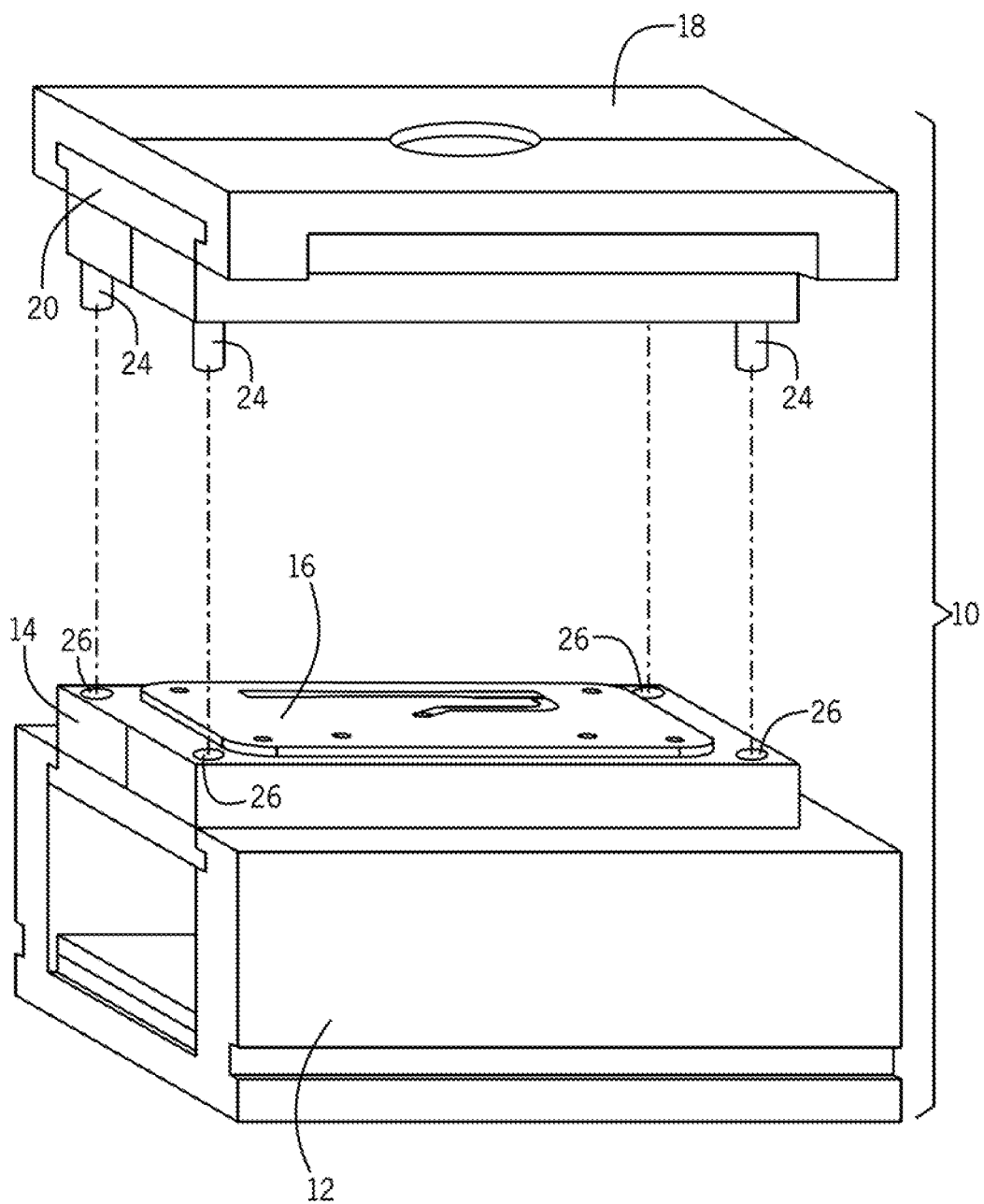
FIG. 1 is a schematic perspective view of an injection molding assembly having a reusable mold for injection molding according to an exemplary embodiment.

Referring now to the drawings wherein the showings are for purposes of illustrating one or more exemplary embodiments and not for purposes of limiting the same, FIG. 1 schematically illustrates a mold assembly 10 according to an exemplary embodiment. The mold assembly 10 of the illustrated embodiment includes a first mold holder 12 having a first mold platen 14 secured thereto. The first mold platen 14 removably secures a first mold member 16, which can be a reusable mold member as will be described in more detail below and is shown removed from the first mold platen 14 and the first mold holder 12 in FIG. 2. In one embodiment, the first holder 12 is a movable holder that moves within a molding machine (not shown).

The mold assembly 10 further includes a second mold holder 18 having a second mold platen 20 secured therein. The second mold platen 20 removably secures a second mold member 22 (not visible in FIG. 1) therein. Like the first mold member 16, the second mold member 22 can be a reusable mold member as will be described in more detail below and is shown removed from the second mold platen 20 and the second mold holder 18 in FIG. 2. In one embodiment, the second holder 18 is a fixed holder on the molding machine and so the first holder 12 is movable relative to the second holder 18 and thus the first mold platen 14 and the first mold member 16 received therein is movable relative to the second mold platen 20 and the second mold member 22 received therein.

As shown in FIG. 1, mold pins 24 can be provided for facilitating closure of the first and second mold platens 14, 20, and thus the first and second mold members 16, 22, relative to one another, such as when the first and second mold members 16, 22 are brought together to close a mold cavity (e.g., mold cavity 30) for injection molding within the mold members 16, 22. In particular, in the illustrated embodiment, the pins 24 extend from the second mold platen 20 and can be formed integrally therewith. The pins 24 are receivable within pin apertures 26 defined in the first mold platen 14 when the second holder 18 with the second mold platen 20 is moved toward the first mold platen 14 with the first mold member 16, such as when closing the first and second mold members 16, 22 for injection molding.

Figure 3:
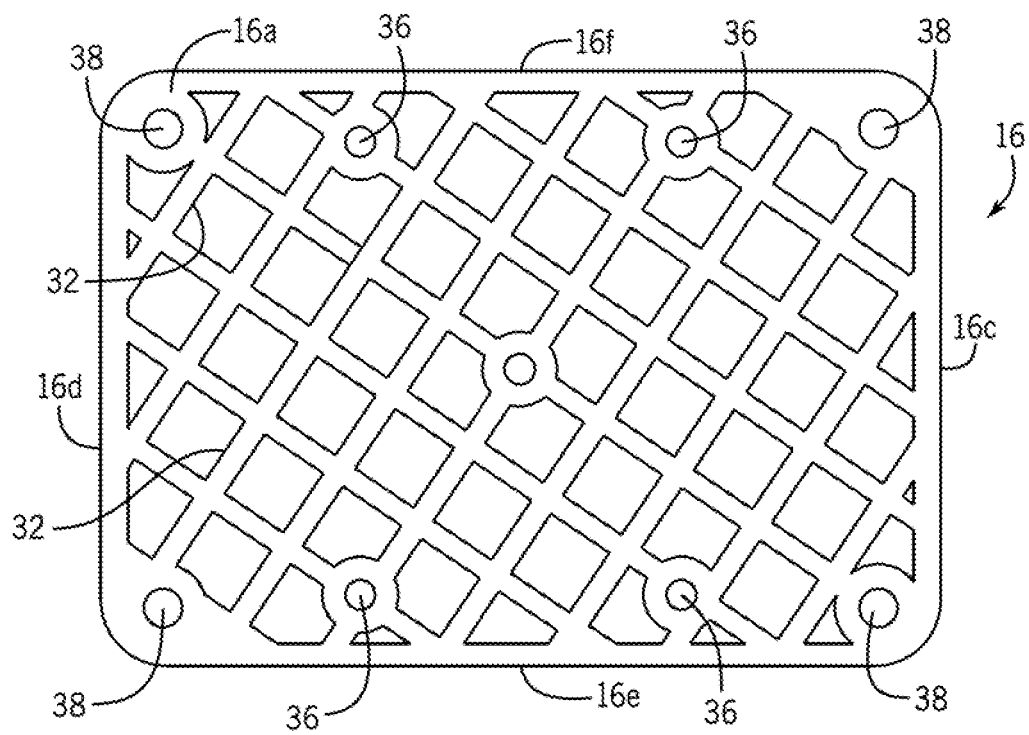
FIG. 3 is a schematic plan view of a backside of the first mold member of FIG. 2.
Figure 4:
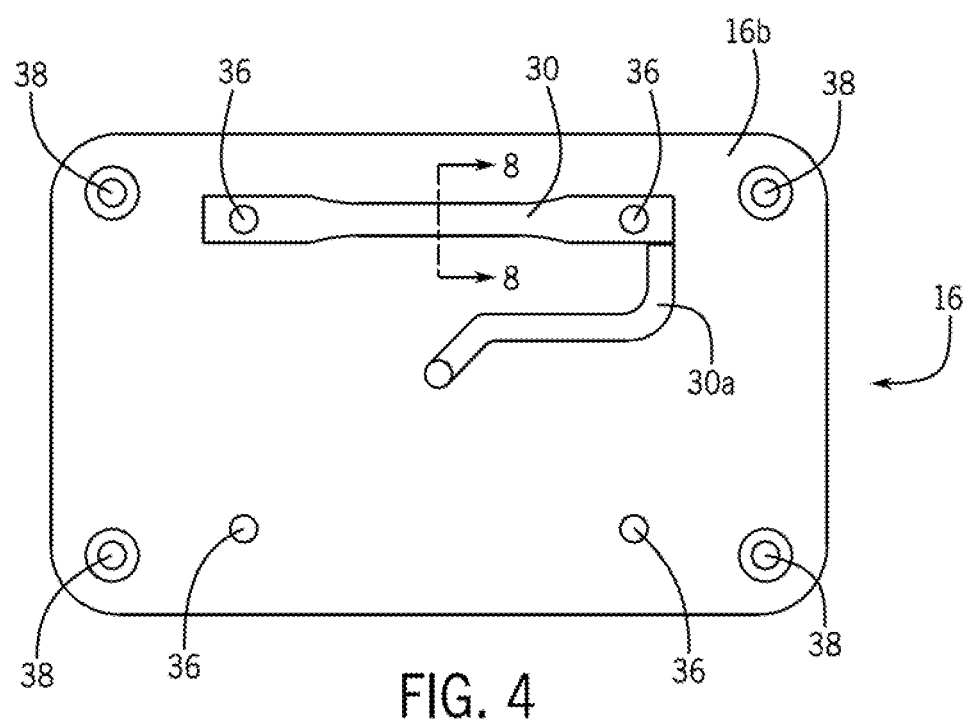
FIG. 4 is a schematic plan view of a front side of the first mold member of FIG. 2.
Figure 5:
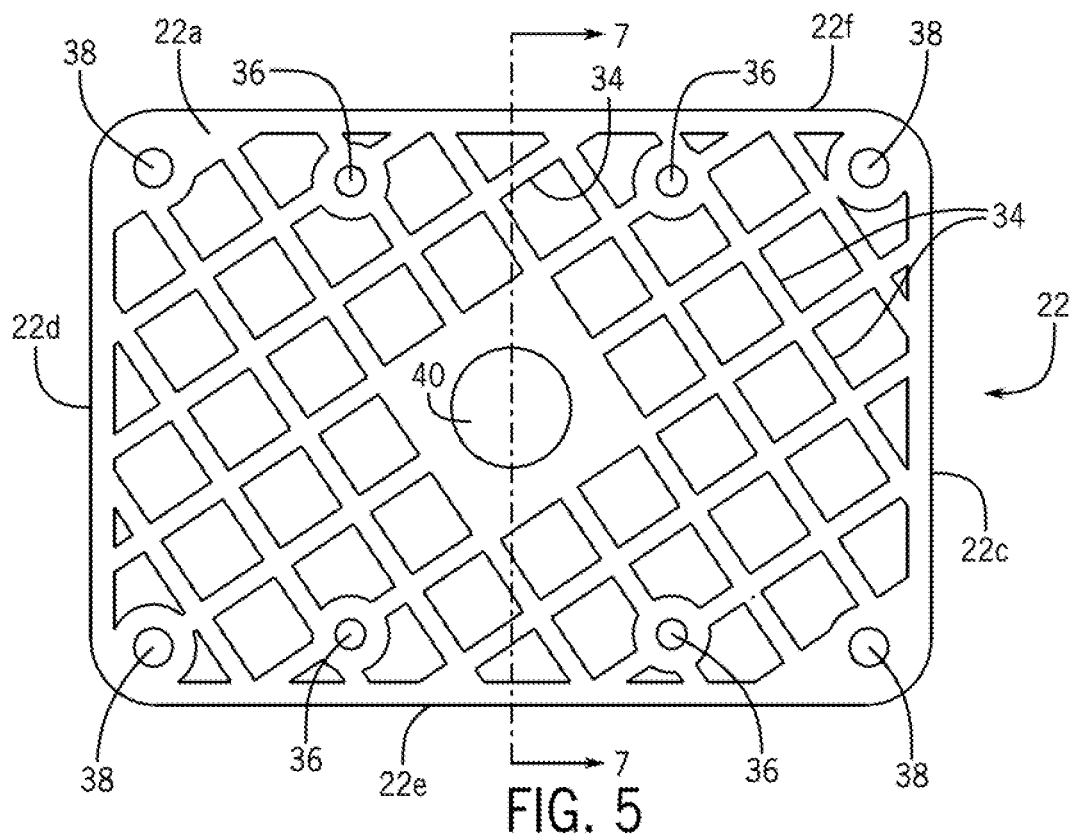
FIG. 5 is a schematic plan view of a backside of the second mold member of FIG. 2.
Figure 6:
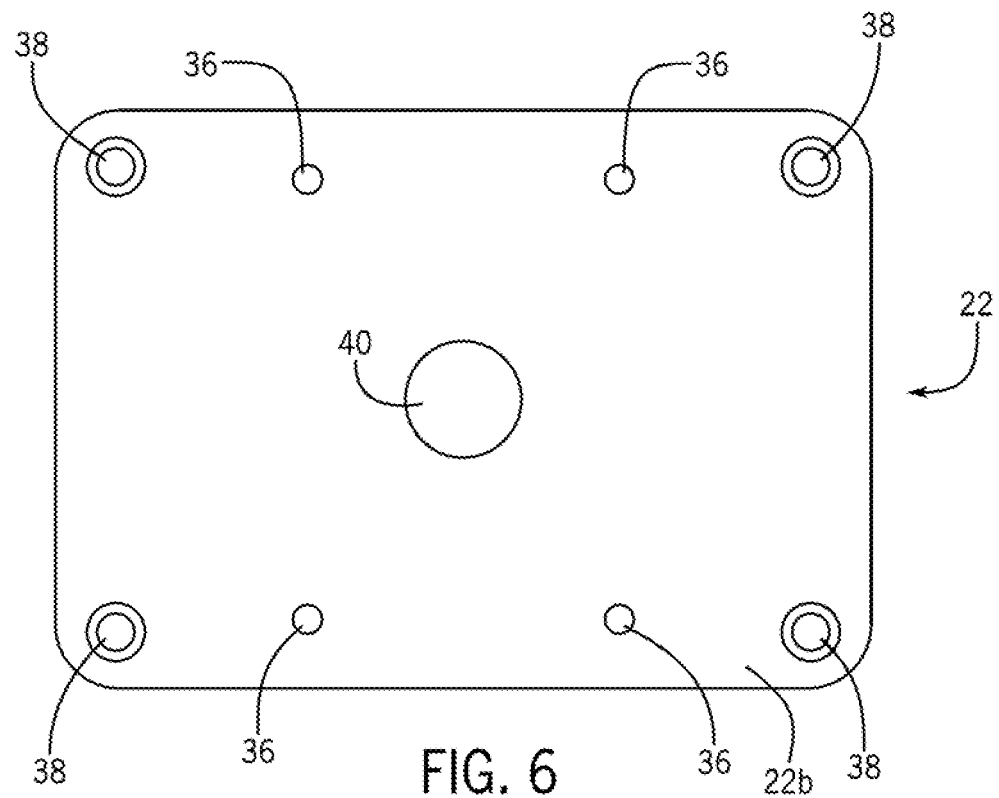
FIG. 6 is a schematic plan view of a front side of the second mold member of FIG. 2.

FIGS. 3 and 4 respectively show a first or backside 16a (FIG. 3) and a second or front side 16b (FIG. 4) of the first mold member 16 with the second side 16b being opposite the first side 16a. The front side 16b is configured to mate against or engage the second mold member 22. In one embodiment, as will be described in more detail below, the first mold member 16 is a reusable mold member. FIGS. 5 and 6 respectively show a first or backside 22a (FIG. 5) and a second or front side 22b (FIG. 6) of the second mold member 22 with the second side 22b being opposite the first side 22a. The front side 22b is configured to mate against or engage the first mold member 16. Like the first mold member 16, the second mold member 22 can be a reusable mold member. As shown, in the illustrated embodiment, the first mold member 16 has a mold cavity 30 defined in the second side 16b, and the second mold member 22 does not form any of the mold cavity. Of course, this is not required and the second mold member 22 could define the mold cavity 30 alone or in combination with the first mold member 16.

Figure 2:
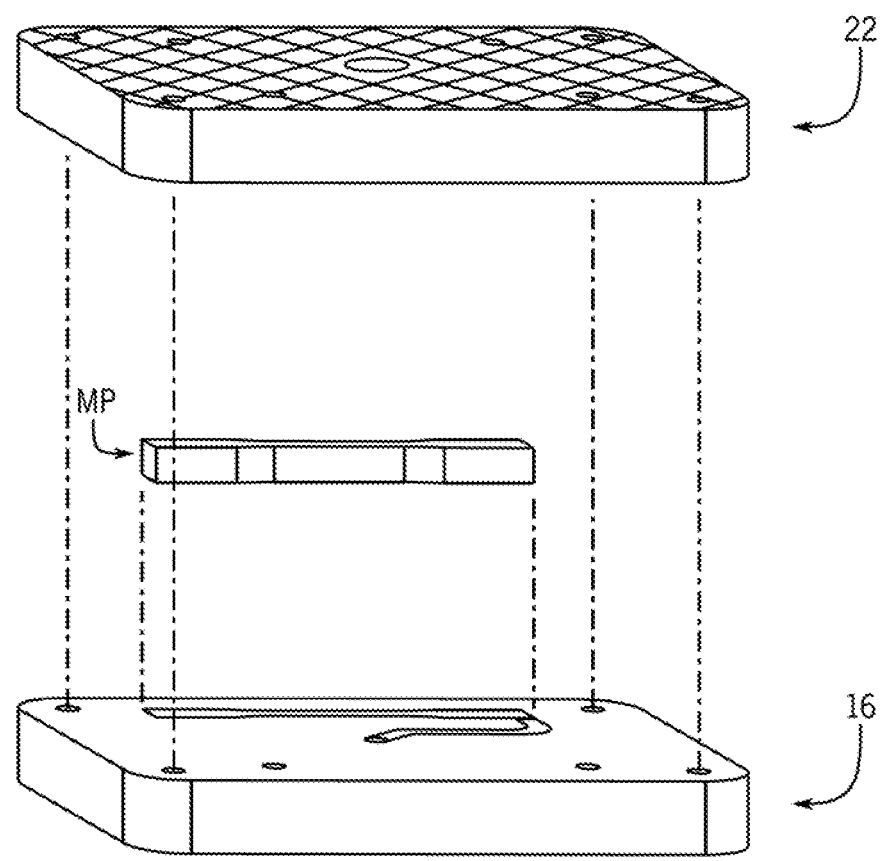
FIG. 2 is an exploded perspective view of first and second reusable mold members of the molding assembly of FIG. 1.

As will be described in more detail below, and with particular reference to FIG. 3, the first mold member 16 can include at least one heat sink recess defined therein (e.g., heat sink recesses 32 shown in the illustrated embodiment defined in the first side 16a) for accommodating a heat sink material HS (e.g., a low melt point heat sink material with high thermal conductivity, such as a fusible alloy for example) therein for rapidly removing heat from the mold cavity 30 when the mold member 16 is used to injection mold a molded part MP (FIG. 2). Similarly, with particular reference to FIG. 5, the second mold member 22 can include at least one heat sink recess defined therein (e.g., heat sink recesses 34 shown in the illustrated embodiment) for accommodating a heat sink material (e.g., the same material HS as accommodated in the first mold member 16) therein for rapidly removing heat from the mold cavity 30 of the first mold member 16 when the mold members 16 and 22 are used to injection mold the molded part MP.

In an exemplary embodiment, each of the reusable mold members, including the first mold member 16 and the second mold member 22, can be formed of a plastic material. In one embodiment, the plastic material is a thermoset material and each of the first and second mold member 16, 22 is formed by additive manufacturing, such as 3D printing for example. In an alternate embodiment, the plastic material is a thermoplastic material with a sufficiently high glass transition or deflection temperature.

Heretofore, it has been found that molded parts formed by plastic mold members can suffer mechanical property degradation due to a limited heat transfer process. This problem is particular to plastic mold members, particularly when replacing metallic tools or mold members which tend to have high thermal conductivity. In contrast, plastic mold members tend to have low thermal conductivity and act as insulators. To address these drawbacks with prior art plastic mold members, the first and second mold members 16, 22 are each formed with the at least one heat sink recess defined respectively therein. In the illustrated embodiment, both mold members 16, 22 are shown having heat sink recesses; however, it is contemplated that the mold members 16, 22 could be formed so that only one or the other has heat sink recesses in alternate embodiments.

As shown in FIGS. 3 and 4, in the first mold member 16, the mold cavity 30 can be defined in the second side 16b and the at least one heat sink recess formed therein (e.g., heat sink recesses 32) can be defined in the second side 16b. In the illustrated embodiment, the at least one heat sink recess defined in the first side 16a of the first mold member 16 is a plurality of heat sink recesses 32 distributed about the first side 16a of the mold member 16. In the illustrated embodiment, the plurality of heat sink recesses 32 is distributed approximately evenly about substantially an entirety of the first side 16a of the first mold member 16. For example, as shown, the heat sink recesses 32 are distributed so as to extend from one longitudinal end 16c of the first mold member to an opposite longitudinal end 16d and to extend from one lateral side 16e to an opposite lateral side 16f. Moreover, in the illustrated embodiment, each of the plurality of heat sink recesses 32 has a parallelogram configuration, and particularly a diamond shaped configuration, that is oriented angularly, such as about 45°, relative to the edges and sides 16c-16f of the first mold member 16. It should be appreciated that other configurations can be used for the heat sink recesses and/or other patterns, numbers, etc. of the heat sink recesses could be used for the first mold member 16.

Similarly, in the second mold member 22, the at least one heat sink recess formed therein (e.g., heat sink recesses 34) can be defined in the first side 22a. However, unlike the first mold member 16, the second side 22b can be substantially planar since it does not define the mold cavity 30 in the illustrated embodiment. Like the first mold member 16, in the illustrated embodiment, the at least one heat sink recess defined in the first side 22a of the second mold member 22 is a plurality of heat sink recesses 34 distributed about the first side 22a of the mold member 22. For example, as shown, the heat sink recesses 34 are distributed so as to extend from one longitudinal end 22c of the first mold member to an opposite longitudinal end 22d and to extend from one lateral side 22e to an opposite lateral side 22f. Moreover, in the illustrated embodiment, each of the plurality of heat sink recesses 34 has a parallelogram configuration, and particularly a diamond shaped configuration, that is oriented angularly, such as about 45°, relative to the edges and sides 22c-22f of the first mold member 22. It should be appreciated that other configurations can be used for the heat sink recesses and/or other patterns, numbers, etc. of the heat sink recesses could be used for the second mold member 22.

Figure 7:
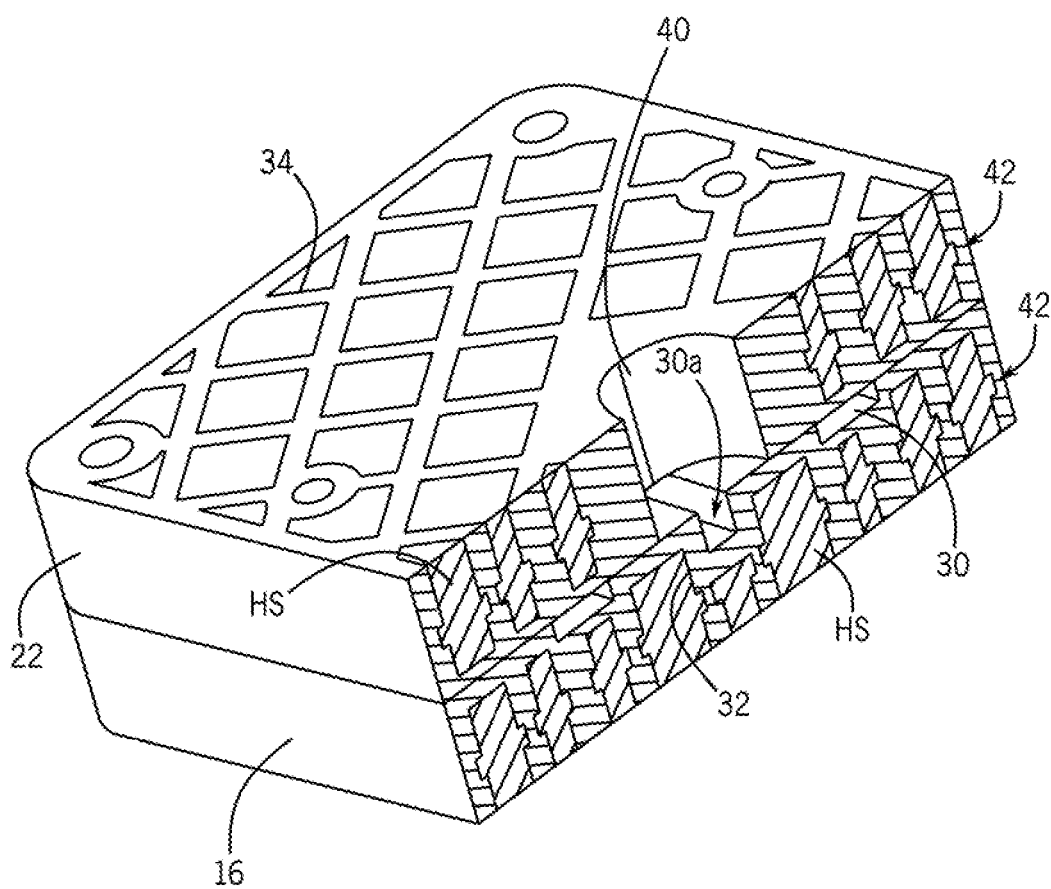
FIG. 7 is a schematic perspective cross-sectional view of the first and second mold members of FIG. 3 shown in abutment with one another.

As shown, the first and second molder members 16, 22 can include through holes 36 for facilitating removal of the molded part MP after injection molding. Also, the first and second mold members 16, 22 can include fixture apertures 38 for receiving fixing devices (not shown) that fixedly secure the mold members 16, 22 to their respective mold platens 14, 20. Also, with additional reference to FIG. 7, the second mold member 22 can include a central injection nozzle aperture 40 for receiving an injection molding sprue bushing (not shown) during the injection molding process for injecting plastic fill material into the mold cavity 30 (e.g., via mold cavity runner 30a).

Further to the above-mentioned drawbacks with prior art plastic mold members, it has been determined that mechanical property degradation of molded parts in plastic additive manufactured molding members can be caused by low thermal conductivity of the plastic mold material. In contrast, when using metallic mold tooling, the injected molten material almost instantaneously solidifies once it hits the tool surface, due to the high rate of heat transfer from the molten material to the metallic mold surface. It has been further found that the molten material forms a solid skin layer at the mold surface of metallic molds as more material is pushed into the mold during the injection cycle. This has been found to be an important factor impacting the molded part mechanical properties. When using a conventional prior art additive manufactured plastic molding member, it has been found that this same skin layer does not have an opportunity to form before more material is injected and this is believed to cause mechanical property degradation. Another detriment when using plastic tooling is the extended length of time the injected material stays in a molten state as compared to when injected into a metallic mold member. In particular, the length of time an injected material stays in its molten state also alters the resultant mechanical properties of the molded part.

To address these concerns with prior art additive manufactured plastic tooling, according to an exemplary embodiment, the first and second mold members 16, 22 include the respective plurality of heat sink recesses 32, 34 therein for accommodating the heat sink material HS for rapidly removing heat from the mold cavity 30 when the mold members 16, 22 are used to injection mold a molded part. For this purpose, the heat sink material HS can be a low melt point material and/or can be a highly thermally conductive material. In one embodiment, the heat sink material HS is a metal or metal alloy that has a low melting point and is highly thermally conductive (e.g., the heat sink material HS can have a thermal conductivity two orders of magnitude larger than the mold members 16, 22 and/or equal or greater than that of tool steel). The heat sink material HS may have a lower melting point relative to the molded part, and may have a higher thermal conductivity relative to the mold member. In a particular embodiment, the heat sink material HS is a fusible alloy that is received within the plurality of heat sink recesses 32, 34. As will be described in more detail below, the heat sink material HS can be selected and arranged so that at least a portion of the heat sink material HS within the heat sink recesses 32, 34 undergoes a phase change from a solid state to a liquid state during injection molding of a molded part to remove heat from the mold cavity.

Advantageously, this enables the mold members 16, 22 to provide at least some of the cooling effects found in conventional metallic mold members while allowing less costly plastic mold members 16, 22 to be used. More particularly, the addition of a high thermal conductivity and low melt temperature material (e.g., fusible alloy) accommodated in the heat sink recesses 32, 34 of the plastic mold members 16, 22 provides for quick heat dissipation during the injection mold cycle. The higher thermal conductivity of heat sink material HS (e.g., a fusible alloy) reduces the ability of the plastic mold members 16, 22 to retain heat and act as heat insulators, which can negatively change the mechanical properties of a molded part. The low melt temperature of the fusible alloy allows the fusible alloy to change state from a solid to a liquid when the mold members 16, 22 are subject to hot material (e.g., the molten plastic material injected into the mold members 16, 22 prior to cooling into the molded part MP). This phase change can expend a significant amount of the thermal energy in the heat transfer process, which creates quicker cooling of the molded part without increasing temperatures of the mold members 16, 22. A further advantage is that this can also reduce the cycle time of the molding process and reduce tool material waste since the heat sink material HS (e.g., the fusible metal alloy) can be reused in future mold members 16, 22 as will be described in further detail below.

Examples of low melting point metals that can be used in the heat sink recesses 32, 34 of the mold members 16, 22 include various fusible metal alloys and low melting point elements. In one embodiment, the fusible metal alloy is Field's metal (an alloy of bismuth, tin, and indium), tin-bismuth solder, or other low melt point alloys that are also highly thermally conductive. In the same or other embodiments, a fusible alloy, such as gallium, is used having a melting point below 30° C. and a conductivity of around 40.6 W/m-K. Other exemplary low melting point metals or alloys that could be used as the heat sink material HS in the mold members 16, 22 can include alloys containing mercury, gallium, bismuth, lead, tin, cadmium, zinc, indium, thallium, and/or only alkali metals as well as pure elements including gallium, bismuth, indium, and tin. In the same or other embodiments, suitable fusible alloys for the mold members 16, 22 can include Woods metal, Rose metal, Galinstan, and NaK. By way of example only, at least some of these other exemplary low melting point metals or alloys can have melt temperatures falling in the range of about 47° C. to about 60° C., for example. In these or a further example, the heat sink material HS can be selected so that it has a melt temperature that is near or below the solidification temperature of the molded part MP.

As for conductivity, the heat sink material HS can be selected to have a thermal conductivity that is similar to or greater than a typical metal (e.g., tool steel having a thermal conductivity of around 27 W/m-K). In the same or another embodiment, the heat sink material HS can be selected so that it has a thermal conductivity of roughly two orders of magnitude greater than the material used to form the mold members 16, 22.

Figure 8:
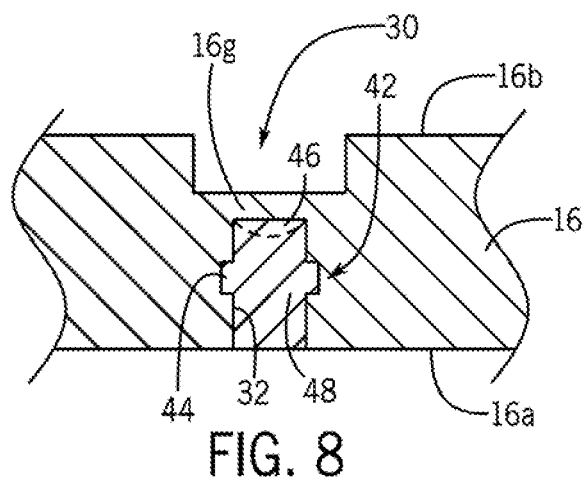
FIG. 8 is a schematic cross sectional view of a mold member showing a plurality of heat sink recesses according to an exemplary embodiment.

With further reference to FIG. 8, the mold cavity 30 can be spaced apart from and not in fluid communication with the heat sink recesses 32 of the first mold member 16. That is, a separating portion 16g of the first mold member 16 can separate the mold cavity 30 from each of the heat sink recesses 32 thereby blocking fluid communication. Additionally, in one embodiment, the thickness of the separating portion 16g can be selected such that it does not overly insulate the molded part MP while the molded part MP is cooling form the heat sink material HS while simultaneously having sufficient structure to allow for accurate manufacture of the mold cavity 30, particularly of the geometry of the mold cavity 30. By way of non-limiting example, and depending on the modulus and thermal conductivity of the plastic used for the mold member 16 and the melting point of the polymer used for the molded part MP, example thickness could be in the range of about 0.1 to about 5 mm in one embodiment, about 0.5 to about 3 mm in another embodiment, and about 1.0 to about 2.0 mm in yet another embodiment. Of course, as will be appreciated by those skilled in the art, the schematically illustrated embodiment of FIG. 8 shows the shape of the heat sink recess 32, particularly the portion thereof closest to the mold cavity 30, as flat, but the shape could be otherwise provided (e.g., hemispherical, tapered, etc.) to maximize thermal conductivity while maintaining deflection tolerations for the mold cavity region that spans the heat sink recess 32.

In an exemplary embodiment, each of the heat sink recesses 32, 34 can include an interlock section or portion 42 that inhibits removal of the heat sink material HS (e.g., fusible alloy) from the heat sink recesses 32, 34 when in a solid or semi-solid state. More particularly, a portion (e.g., portion 44) of the heat sink material received in the interlock section 42 prevents the heat sink material HS from falling or otherwise moving out of the mold member 16 or 22 when at least the portion 44 received in the interlock section 42 is in a solid state.

Moreover, when another portion 46 is in a liquid state and a remaining portion 48 including that which is received in the interlock portion 42 is in a solid state, the liquid portion 46 is inhibited from falling out or otherwise being removed from the mold members 16, 22. More particularly, during cooling and/or injection molding of the molded part MP, a limited amount (e.g., portion 46) of the heat sink material HS may phase change to a liquid with a remaining portion 48 remaining in a solid state. As shown in FIG. 8, the interlock section 42 can be spaced apart from the backside 16a of the mold member 16 into which the heat sink recess 32 is defined, and can also be spaced apart from the mold cavity 30 a distance sufficient to avoid melting of the portion 44 of the heat sink material HS disposed within the interlock portion 42 when the molded part MP is cooled within the mold member 16. Likewise, the interlock section 42 of the second mold member 22 can be spaced apart from the lateral side 22f of the second mold member 22, which itself will close the mold cavity 30 when the mold members 16, 22 are brought together for injection molding.

Also advantageous is that the heat sink material HS, such as a fusible alloy, can be arranged to reinforce the mold member 16 or 22. In particular, when the mold members 16, 22 are formed of a plastic material, the mold members 16, 22 may benefit from some reinforcing and this can be accomplished by receipt within the heat sink recesses of the heat sink material HS, particularly when the heat sink material HS is in its solid state (or more than a majority of the heat sink material is in its solid state). For example, the heat sink material HS can have a higher elastic modulus than that of the mold member 16 such that, even when in liquid form or partial liquid form, the heat sink material can support molding pressure via hydrostatic pressure.

Figure 9:
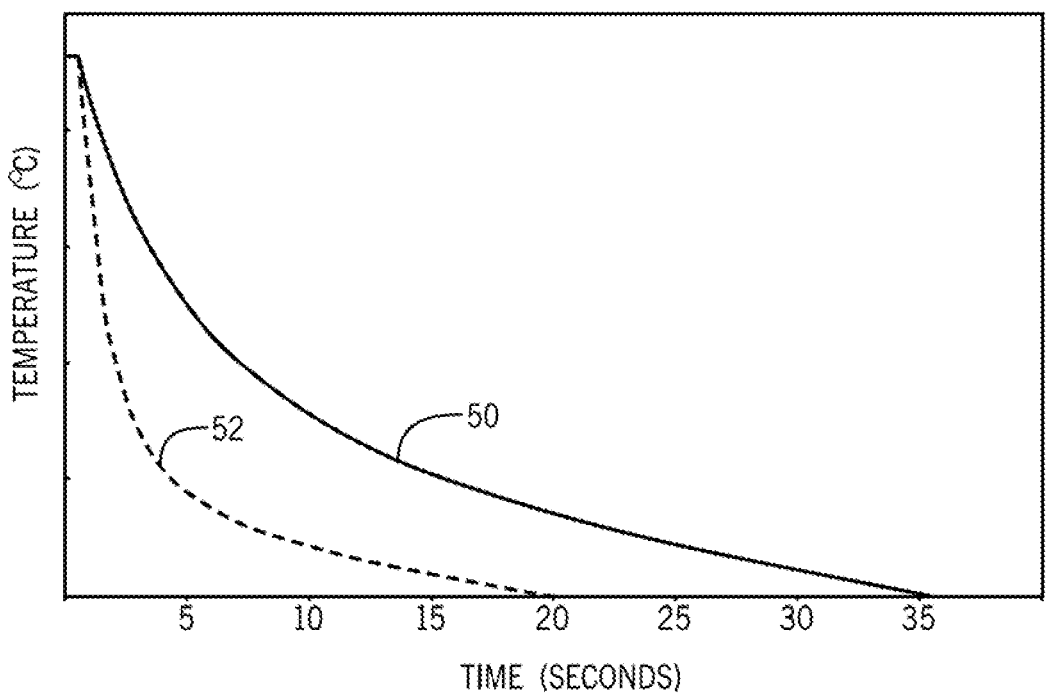
FIG. 9 is a schematic chart illustrating cooling time versus temperature for molded parts.

With reference now to FIG. 9, a graph is shown schematically and graphically illustrating cooling of molded parts. The first line 50 illustrates cooling of a molded part in a conventionally molded plastic mold member. In contrast, line 52 illustrates cooling of a molded part molded in the first and second mold members 16, 22 having a fusible alloy received in the heat sink recesses 32, 34. As can be readily appreciated from the FIG. 9, cooling is much more rapid for the line 52 corresponding to plastic mold members 16, 22 having the heat sink recesses 32, 34 defined therein and accommodating the heat sink material.

Figure 10:
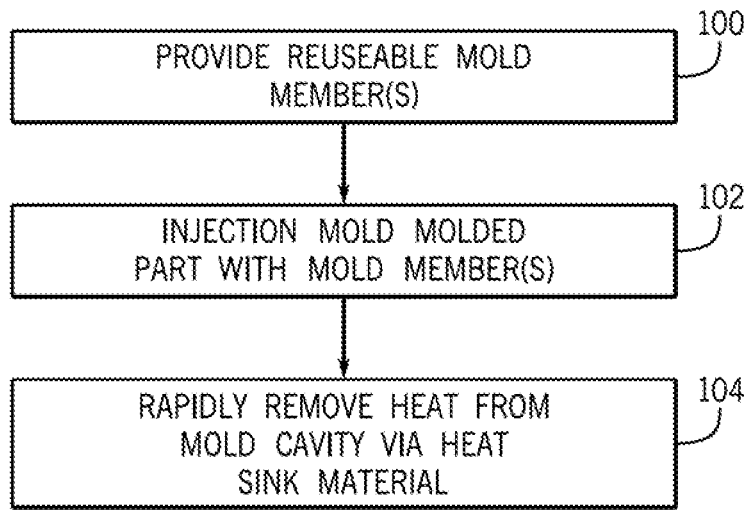
FIG. 10 is a block diagram schematically illustrating a molding method for injection molding with a reusable mold.

Referring now to FIG. 10, a molding method for injection molding with a reusable mold will be described. In particular, the method of FIG. 10 will be described in association with the reusable mold members 16, 22 described hereinabove, though it is to be appreciated that the method could be used with other mold members. In the method, as indicated at 100, reusable mold members 16, 22 having at least one mold cavity defined in at least one of the mold members 16, 22 (e.g., mold cavity 30 defined in the first mold member 16) and having at least one heat sink recess defined therein (e.g., heat sink recesses 32 and first mold member 16 and heat sink recesses 34 and second mold member 22) accommodating a heat sink material HS for rapidly removing heat from mold cavity 30 are provided. Next, at 102, a molded part is injection molded with the reusable mold members 16, 22. Then, at 104, heat is rapidly removed from the mold cavity 30 of the mold member 16 via the heat sink material accommodated in the heat sink recesses 32, 34 of the mold members 16, 22.

Providing the reusable mold members 16, 22 in 100 can include the following: heating the heat sink material HS above a melt temperature thereof to liquefy the heat sink material HS, pouring the liquefied heat sink material HS into the heat sink recesses 32, 34, and cooling the heat sink material HS below the melt temperature thereof to solidify the heat sink material HS prior to injection molding the molded part MP with the reusable mold members 16, 22. As already described herein, cooling of the heat sink material HS below its melt temperature to solidify the heat sink material HS can include mechanically interlocking the heat sink material HS with a portion 42 of the reusable mold 16 or 22 defining the at least one heat sink recess 32 or 34 to inhibit removal of the heat sink material HS from the at least one heat sink recess 32 or 34.

Cooling of the heat sink material HS below its melt temperature to solidify the heat sink material HS can further include reinforcing the reusable mold members 16, 22 with the heat sink material HS. In other words, when the heat sink material HS is solidified, the heat sink material HS advantageously reinforces the mold members 16, 22, particularly when such mold members are formed from the plastic material.

As already discussed hereinabove, providing the reusable mold member 16, 22 can include forming the reusable mold member 16, 22 of a plastic material, such as a thermoset or thermoplastic material (e.g., ABS or acrylic), via additive manufacturing. Additive manufacturing can include, for example, 3D printing and the like. In 104, rapidly removing heat from the mold cavity 30 of the first mold member 16 via the heat sink material HS in the plurality of heat sink recesses can include phase changing at least a portion of the heat sink material HS from solid to liquid.

Figure 11:
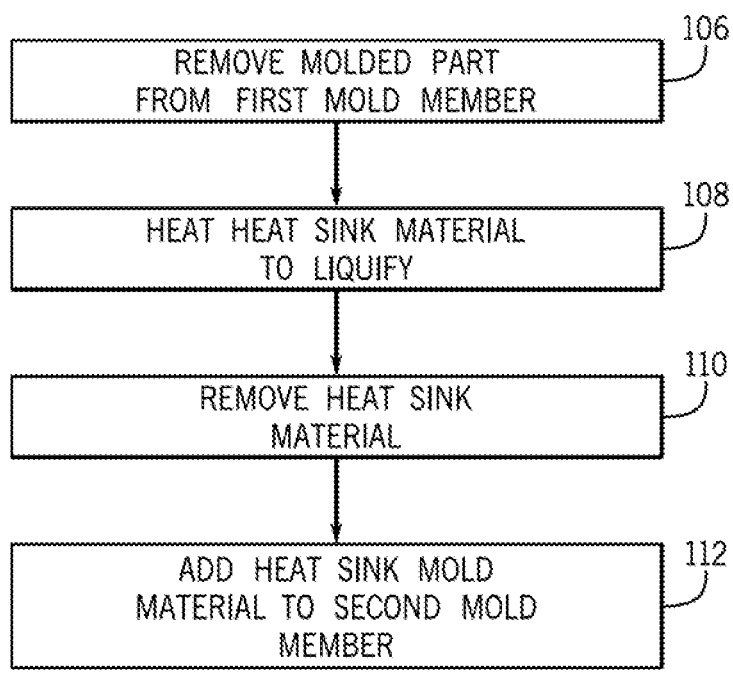
FIG. 11 is a block diagram schematically illustrating further steps for the molding method of FIG. 10.

With further reference to FIG. 11, the method of FIG. 10 can further include steps 106, 108, 110, and 112. More particularly, as indicated in 106, the reusable mold member 16 can be a first reusable mold member. At 106 the molded part is removed from the mold cavity 30 of the first reusable mold member 16. Next at 108, the heat sink material HS can be heated above a heat sink material HS melt temperature to liquefy the heat sink material HS. Then, at 110, the heat sink material HS can be removed from the first reusable mold member 16 (i.e., after liquefying the heat sink material HS at 108). Subsequently, the heat sink material HS can be added at 112 to a second reusable molder member (not shown and different from mold members 16, 22) having a second mold member mold cavity defined therein and a second mold member at least one heat sink recess defined therein. In particular, adding of the heat sink material HS to the second reusable mold member at 112 can include accommodating the heating sink material within the second mold member at least one heat sink recess. In this manner, the heat sink material HS is reusable in different plastic mold members.

Figure 12:
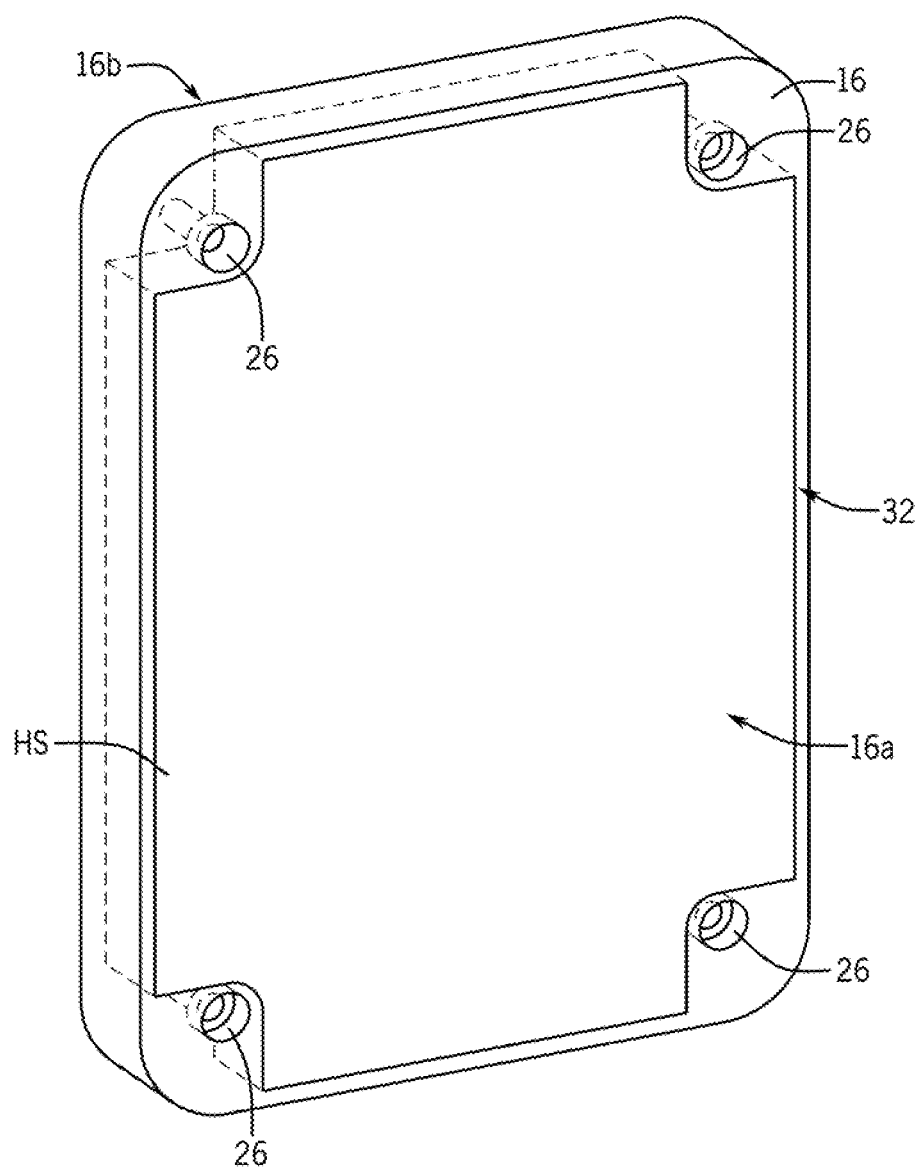
FIG. 12 is a schematic perspective back view of another mold member according to an exemplary embodiment.
Figure 13:
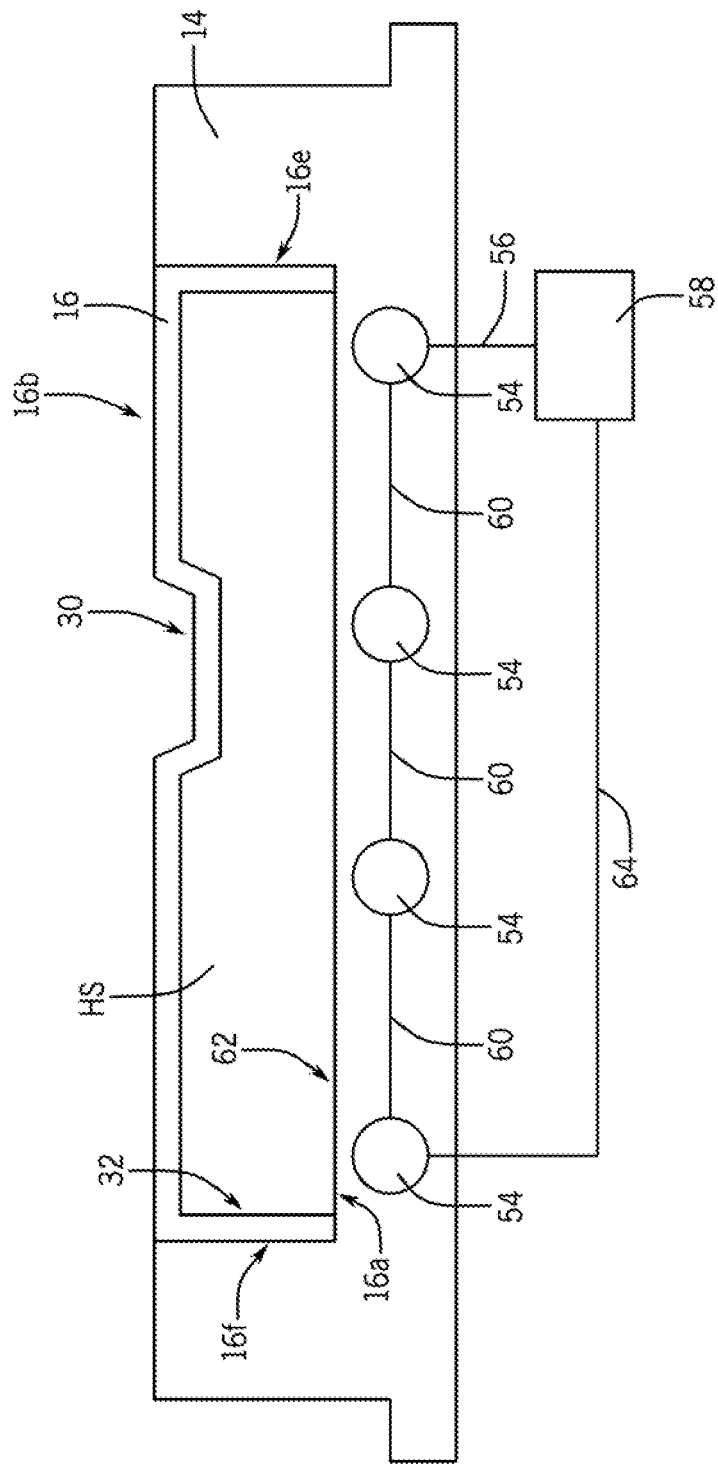
FIG. 13 is a schematic sectional view of the mold member of FIG. 12 mounted on a platen according to an exemplary embodiment.
Figure 14:
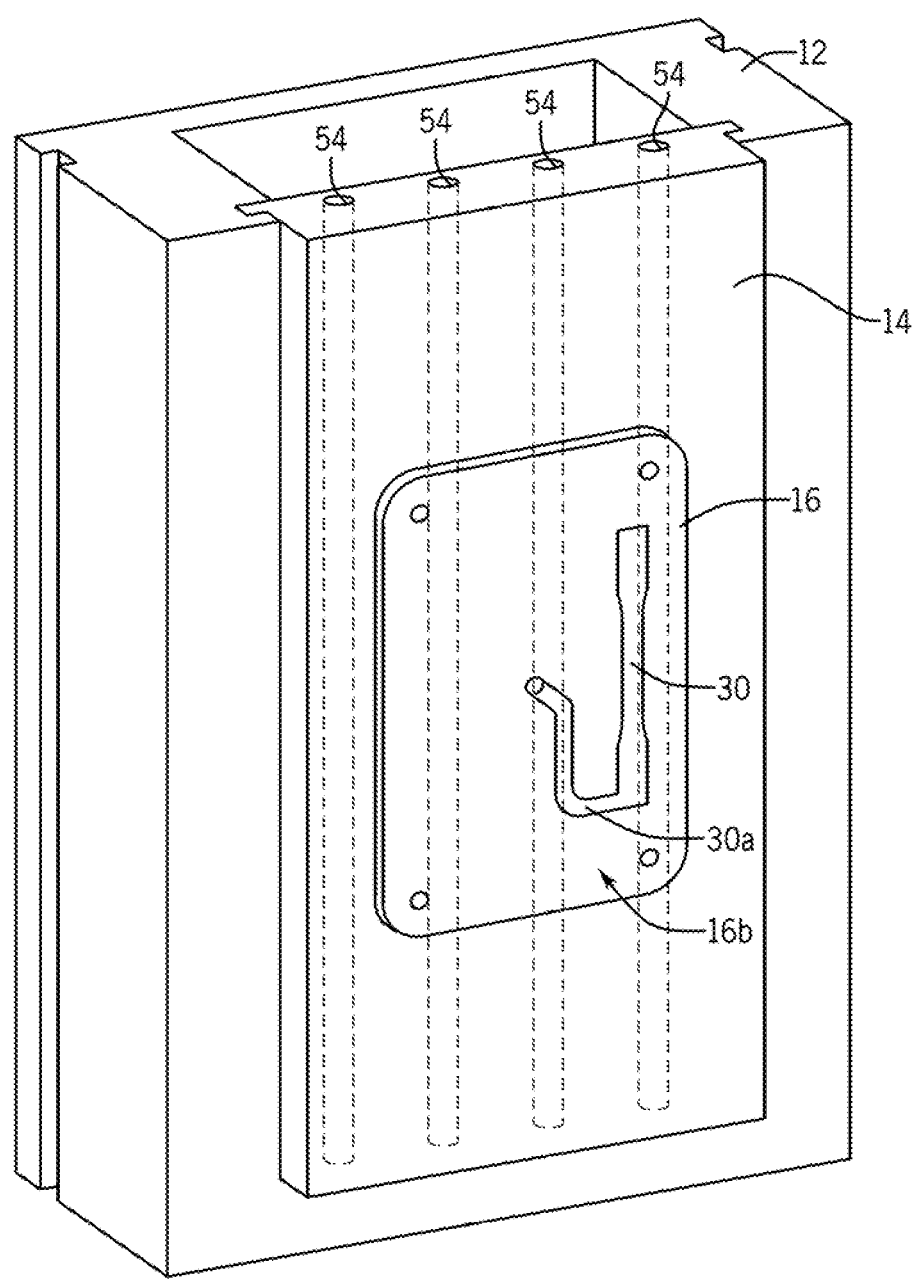
FIG. 14 is a schematic perspective front view of the mold member and mold holder of FIG. 13 mounted on a mold holder.

With reference to FIG. 12-14, another first mold member 16 is depicted. The first mold member 16 in this embodiment, is similar to that shown in FIGS. 1-4, 7, 8, and can be a reusable mold member. The first mold member 16 is shown in FIG. 12 from the backside 16a and removed from the first mold platen 14 and the first mold holder 12, is shown in FIG. 13 arranged in the first mold platen 14, and is shown in FIG. 14 from the front side 16b further arranged in the first mold holder 12. As in the other embodiment of FIGS. 1-4, 7, 8, the first mold member 16 can be formed of a plastic material, e.g. a thermoset material and may be formed by additive manufacturing, such as 3D printing for example, or from a thermoplastic material with a sufficiently high glass transition or deflection temperature to withstand the molding process.

In this embodiment, the first mold member 16 is different from that shown in FIGS. 1-4, 7, 8 in that it has only one heat sink recess 32, although this is not required, and one or more heat sink recesses may be included. As shown in FIG. 12, the heat sink material HS is distributed in the heat sink recess 32 at the backside 16*a* of the first mold member 16 so as to occupy almost the entire backside 16*a* of the first mold member 16. In this arrangement and as shown in FIG. 13, the heat sink material HS at the backside 16*a* is thus in direct contact at an interface 62 with the first mold platen 14 to allow a transfer of thermal energy through the interface 62 between the heat sink material HS and the first mold platen 14.

Additionally, the first mold platen 14 is different from that shown in FIG. 1, in that it is fluid-cooled by including internal cooling lines 54 arranged within the first mold platen 14 for circulating a cooling fluid therein. The cooling lines 54 are arranged parallel to each other and run longitudinally as depicted. However, this arrangement of cooling lines 54 is not required, and the cooling lines 54 could run perpendicular to this or in other directions and arrangements with respect to the first mold platen 14, and may be included in different numbers than the four depicted.

The cooling lines 54 circulate a cooling fluid provided from a fluid supply 58 in order to fluid cool the first mold platen 14, and thereby cool the first mold member 16 through heat transfer between them through the interface 62. Having the cooling lines 54 in the first mold platen 14 allows them to be used to cool any mold member arranged on the platen. Additionally, if the cooling lines 54 were instead included in the mold member, then the costs, time, and difficulty in manufacturing the mold member would increase. The fluid supply 58 is attached to the cooling lines 54 through one or more connector lines, including a main connector line 56 providing fluid communication between the fluid supply 58 and the cooling lines 54, and optionally secondary connector lines 60 providing fluid communication between the various cooling lines 54. A return fluid line 64 returns the cooling fluid to the fluid supply 58 from the cooling lines 54. As shown, the cooling lines 54 are connected in series, however this is not required and each of the cooling lines 54 could be connected in parallel and directly to the fluid supply 58. The fluid supply 58 may include a pump for moving the cooling fluid through the cooling lines 54 and a compressor for providing heat exchange for the cooling fluid.

The first mold member 16 in this embodiment may be brought together with a second mold member to form the molded body similar to the second mold member 22 of FIGS. 1-6, and similar to the first mold member 16 of this embodiment including having a single heat sink recess 32. The second mold member in this embodiment may be arranged in a second mold platen that has cooling lines like the cooling lines 54 in the first mold platen 14 of this embodiment.

By including the heat sink material HS and the cooling lines 54, heat may be rapidly removed from the mold cavity 30 when the mold members are used to injection mold a molded part MP. Moreover, since the heat sink material HS does not contact the molded part MP during a molding operation, and thus is not contaminated by the material of the molded part MP, the heat sink material HS can be reused in other molds as desired. Additionally, by including the large single heat sink recess 32 in this embodiment 8, the amount of time necessary to 3D print the first mold member 16 may be reduced as compared with the embodiment of FIGS. 1-4, 7, which has many heat sink recesses and thus may use more polymer material to make the first mold member in that embodiment. This may reduce the time and cost of the making the first mold member 16 on a 3D printing machine, the use of which may be limited or may be more expensive than filling the heat sink recess 32 with heat sink material HS. Further, the heat sink material HS in this embodiment is largely in direct contact at the interface 62 with the fluid-cooled first mold platen 14, thus further increasing heat transfer between the two and quickly removing heat from the mold cavity 30 and molded part MP.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A reusable mold for injection molding, comprising:
  a reusable mold member including a front side and a back side opposite the front side;
  a mold cavity defined in the front side of the mold member;
  a heat sink material;
  at least one heat sink recess defined in the mold member for accommodating the heat sink material therein for rapidly removing heat from the mold cavity when the mold member is used to injection mold a molded part, the at least one heat sink recess being defined only in the back side of the mold member and having an opening only at the back side of the mold member; and
  a mold platen on which the mold member is arranged, and including internal cooling lines through which a cooling fluid travels;
  wherein the at least one heat sink recess includes an interlock section in the form of an undercut in a sidewall of the at least one heat sink recess, the undercut being filled with the heat sink material and thus inhibits removal of the heat sink material from the at least one heat sink recess when the heat sink material is in a solid or semi-solid state; and
  wherein the interlock section is spaced apart from the opening and is spaced from the mold cavity a distance sufficient to avoid melting of the heat sink material disposed within the interlock section when the molded part is cooled within the mold member.

2. The reusable mold of claim 1, wherein the reusable mold member comprises a thermoset material.

3. The reusable mold of claim 2, wherein:
  the heat sink material has a lower melting point relative to the molded part and has higher thermal conductivity relative to the mold member;
  the heat sink material is in direct contact with the mold platen.

4. The reusable mold of claim 3, wherein the reusable mold member is formed by additive manufacturing.

5. The reusable mold of claim 1, wherein the at least one heat sink recess extends into the mold member so as to be 0.1-5.0 mm from the mold cavity.

6. The reusable mold of claim 5, wherein the mold cavity is spaced apart from and not in fluid communication with the at least one heat sink recess; and wherein a bottom surface of the at least one heat sink recess is parallel with the front side of the mold member.

7. The reusable mold of claim 1, wherein the heat sink material is a fusible alloy, the fusible alloy having a thermal conductivity two orders of magnitude larger than the mold member, and only a portion of the fusible alloy is arranged to undergo a phase change from a solid state to a liquid state during injection molding of the molded part to remove heat from the mold cavity.

8. The reusable mold of claim 1 wherein the at least one heat sink recess is only a single heat sink recess that is defined by the front side of the mold member and sidewalls of the mold member that extend away from the front side of the mold member.

9. The reusable mold of claim 1, wherein the at least one heat sink recess is a plurality of heat sink recesses distributed about the back side of the mold member and separated by a straight grid formed by a material of the mold member.

\* \* \* \* \*